March 5, 1963    B. S. BOBROV ETAL    3,079,606
INSTRUMENT FOR PLACING LATERAL GASTRO-INTESTINAL ANASTOMOSES
Filed Jan. 4, 1960    2 Sheets-Sheet 1

March 5, 1963  B. S. BOBROV ETAL  3,079,606
INSTRUMENT FOR PLACING LATERAL GASTRO-INTESTINAL ANASTOMOSES
Filed Jan. 4, 1960  2 Sheets-Sheet 2

3,079,606
INSTRUMENT FOR PLACING LATERAL GASTRO-
INTESTINAL ANASTOMOSES
Boris Sergeevich Bobrov, Apt. 35, Pogonny Proiezd I, and Jurji Jakovlevich Gritzman, Apt. 12, Botanicheskji By-Street 7, both of Moscow, U.S.S.R.
Filed Jan. 4, 1960, Ser. No. 7,961
4 Claims. (Cl. 1—120)

This invention relates to surgery and more particularly to an instrument for placing gastro-intestinal anastomoses by mechanical means, or in other words, an instrument for suturing the gastric and intestinal walls with spaced parallel rows of metal staples.

It is accordingly an object of the invention to provide an instrument for suturing the gastric and intestinal walls with metal staples which provides for the insertion of serosa-muscular sutures (serosa touching serosa) from the side of the mucosa by inserting the tips of the instrument into the lumens of the organs to be sutured through apertures in the walls of the organs.

A further object of the invention is the provision of an instrument for suturing the gastric and intestinal walls with metal staples, including jaws having pointed ends and means to prevent relative lateral movement of the jaws during the suturing operation.

A still further object of the invention is the provision of an instrument for suturing the gastric and intestinal walls with metal staples, including a staple inserting jaw and a staple clinching jaw, the staples being progressively driven and clinched by means of a wedge member moving longitudinally within the inserting jaw.

Another object of the invention is the provision of an instrument for suturing the gastric and intestinal walls with metal staples, in which means is provided for inserting and clinching staples simultaneously in spaced rows.

A further object of the invention is the provision of an instrument for suturing the gastro and intestinal walls with metal staples in which means is provided for inserting and clinching staples simultaneously in spaced rows and including means for severing the walls of the organs between the rows of staples.

Figure 1:
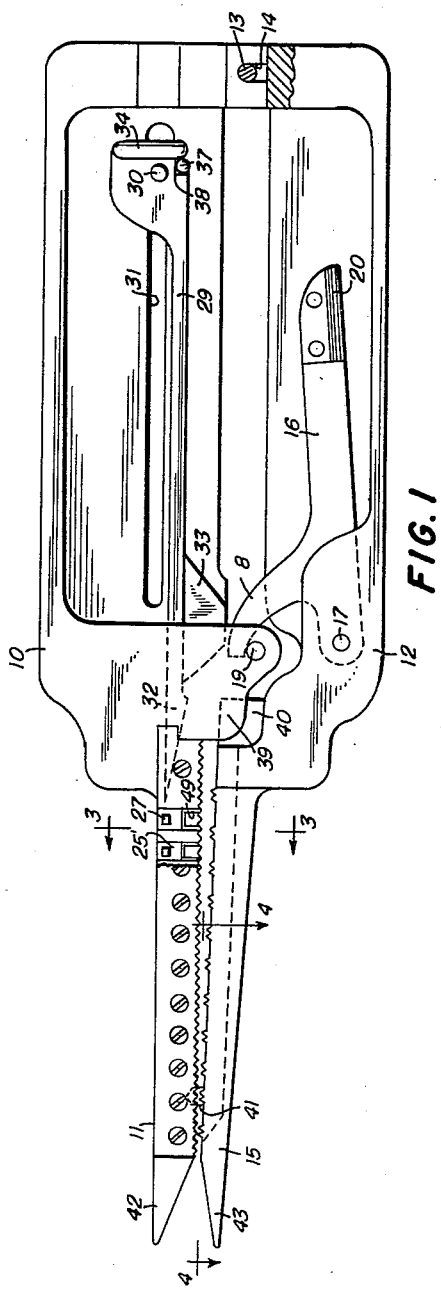
Figure 2:
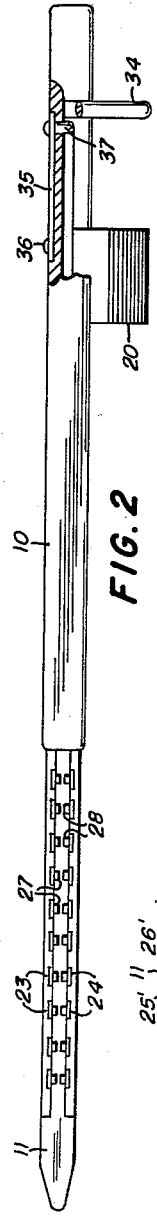
Figure 3:
Figure 4:
Figure 5:
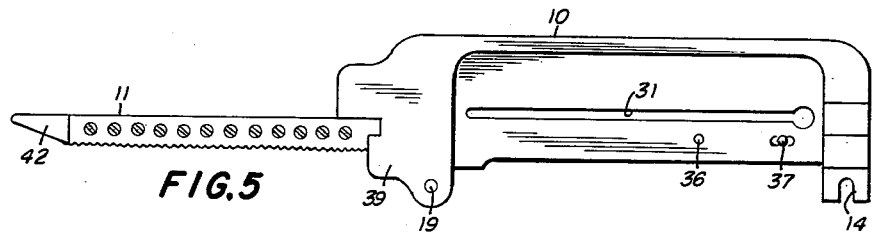
Figure 6:
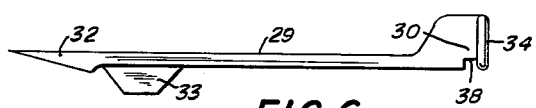
Figure 7:
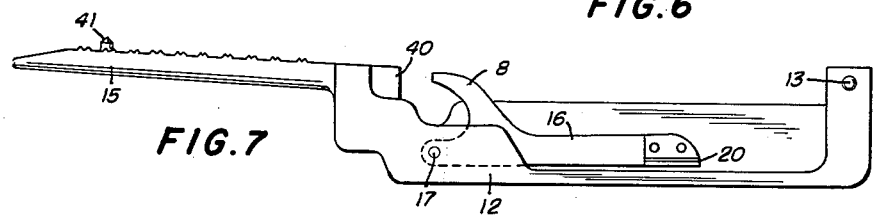
Figure 8:
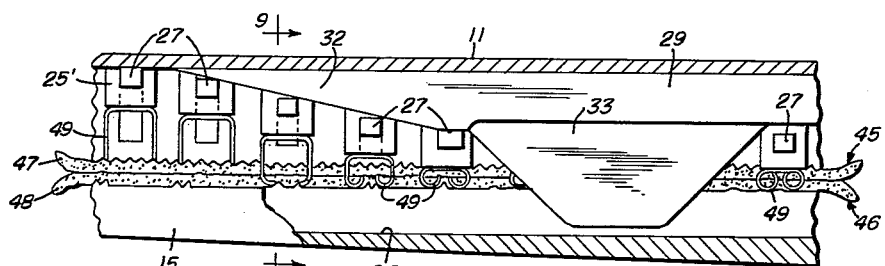
Figure 9:
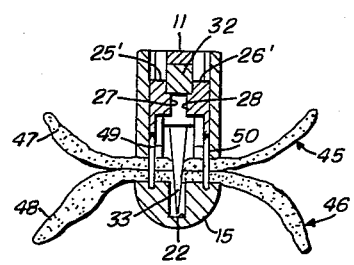

Further objects and advantages of the invention will be apparent from the following description taken in conjunction with the accompanying drawings wherein:

FIG. 1 is a side elevational view of an instrument constructed in accordance with this invention and with the jaws in staple inserting and clinching position;

FIG. 2 a top plan view of the instrument shown in FIG. 1;

FIG. 3 a sectional view taken substantially on the line 3—3 of FIG. 1;

FIG. 4 a sectional view taken substantially on the line 4—4 of FIG. 1;

FIG. 5 a side elevational view of one body member and staple inserting jaw carried thereby;

FIG. 6 a side elevational view of the actuating bar, together with the wedge and knife carried thereby;

FIG. 7 a side elevational of a second body member, together with the staple clinching jaw carried thereby;

FIG. 8 a fragmentary sectional view showing the operation of the actuating bar and wedge, as well as the operation of the severing knife;

FIG. 9 a sectional view taken substantially on the line 9—9 of FIG. 8; and

Figure 10:
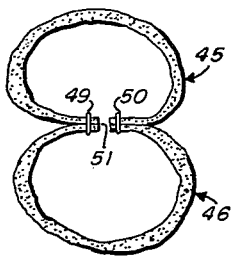

FIG. 10 a sectional view of a lateral intestinal anastomosis provided by the instrument of this invention.

With continued reference to the drawings, there is shown an instrument for suturing the gastric and intestinal walls with spaced parallel rows of metal staples and while such staples may be formed of any suitable material, it has been found that tantalo-niobium wire is preferred for this purpose. The instrument, as shown, may well comprise a body member 10 providing a portion of a handle by means of which the instrument may be grasped and operated and the body member 10 is provided with an elongated staple inserting jaw 11. A second body member 12 which is substantially complementary to the first body member 10 is detachably and pivotally connected to the first body member 10 adjacent the rear end thereof by means of a pivot pin 13 on the body member 12 received in a slot 14 on the body member 10. The second body member 12 is provided with an elongated staple clinching jaw 15 which is disposed in the plane of the staple inserting jaw 11 when the jaws are in operative position. A lever 16 is pivotally mounted at 17 on the second body member 12 and the lever 16 is provided with a latch member 8 engageable with a latch pin 19 on the first body member 10, as clearly shown in FIG. 1, to releasably lock the body member 10 and body member 12 together with the jaws 11 and 15 carried thereby in operative position. In order to facilitate operation of the lever 16, there may be provided a finger engaging ear 20 thereon.

As best shown in FIG. 3, a longitudinal groove 21 is provided in the staple inserting jaw 11 and such groove 21 opens toward the staple clinching jaw 15. The staple clinching jaw 15 is likewise provided with a longitudinal groove 22 opposing and in alignment with the groove 21 in the staple inserting jaw 11. The staple inserting jaw 11 is provided with a plurality of longitudinally spaced opposed staple receiving recesses 23 and 24 in the sidewalls 25 and 26 respectively of the groove 21 and slidably disposed in the recesses 23 and 24 are staple driving members 25' and 26'. The staple driving members 25' and 26' are provided with lugs 27 and 28 respectively projecting into the groove 21.

With particular reference to FIGS. 1 and 6, there is shown a staple driver actuating means in the form of an elongated bar 29 provided with a laterally projecting pin 30 slidably received in a slot or groove 31 in the body member 10 and the bar 29 is also slidably received in the groove 21 of the staple inserting jaw 11. The actuating bar 29 is provided at the forward end thereof with a wedge 32 and rearwardly thereof, there is provided a downwardly projecting knife blade 33, the purpose and operation of which will be presently described. The bar 29 is provided adjacent the rear end thereof with a finger engaging ear 34 to facilitate operation of the bar 29 by the user and in order to prevent inadvertent operation of the bar 29, there may be provided a spring 35 secured to the body member 10, as at 36, and with a pin 37 on the spring 35 projecting into a notch 38 in the bar 29 adjacent the finger engaging ear 34.

In order to insure that the jaws 11 and 15 are in proper alignment during operation of the instrument, there may be provided spaced cheek pieces 39 on the body member 10 which serve to overlap and engage a portion 40 on the body member 12 when the parts of the instrument are in operative position. A further aligning and locating means is provided in the form of a pointed pin 41 secured to the staple clinching jaw 15 adjacent the outer end thereof and the pointed end of the pin 41 is received in the groove 21 in the staple inserting jaw 11 when the parts of the instrument are in operative position. In order to facilitate use of the instrument, the forward ends 42 and 43 of the jaws 11 and 15 respectively may be pointed, as clearly shown in FIGS. 1 and 2. As shown in FIG. 4, the staple clinching jaw 15 is provided with staple clinching anvil portions 44 disposed opposite the staple receiving recesses 23 and 24 in the staple inserting jaw 11.

The operation of the instrument of this invention is best shown in FIGS. 8, 9 and 10 and in order to provide a lateral intestinal anastomosis an incision is made adjacent portions 45 and 46 of the intestines to permit insertion of the staple inserting jaw 11 in the portion 45 and insertion of the staple clinching jaw 41 in the portion 46. The jaws 11 and 15 are positioned, as shown in FIGS. 8 and 9, with the jaws clamping the walls 47 and 48 of the intestinal portions 45 and 46 respectively therebetween. The jaws are locked in this position by operation of the lever 16. It is assumed that staples 49 are positioned in the recesses 23 and staples 50 positioned in the recesses 24. At this time, the pin 37 on the spring 35 is released from the notch 38 in the actuating bar 29 and by engagement of the hand of the operator with the finger engaging ear 34, the bar 29 is moved forwardly to bring the wedge 32 on the bar 29 into engagement with the lugs 27 and 28 of the staple driving members 25' and 26' which will operate to move such driving members downwardly in the staple receiving recesses 23 and 24 to engage the staples 49 and 50 to force the same through the walls 47 and 48 of the intestinal portions 45 and 46 and into engagement with the clinching anvil surfaces 44 on the clinching jaw 41. This will result in progressively inserting and clinching the staples 49 and 50, as clearly shown in FIG. 8, and will operate to firmly suture the walls 47 and 48 together as shown in FIGS. 9 and 10. Since it is desired to provide communication between the sutured intestinal portions 45 and 46, the knife blade 33 carried by the actuating bar 29 rearwardly of the wedge 32 moves between the rows of clinched staples 49 and 50 to sever the walls 47 and 48, as shown at 51 in FIG. 10. During this operation the knife blade 33 moves in the groove 22 of the staple clinching jaw 15. Upon completion of the suturing operation, the lever 16 may be actuated to permit separation of the body member 10 and staple inserting jaw 11 from the body member 12 and staple clinching jaw 15 thereby facilitating withdrawal of the jaws 11 and 15 from the intestinal portion 45 and 46. Thereafter, the incisions through which the jaws 11 and 15 were inserted may be closed by conventional suturing operation.

It will be seen that by the above described invention there has been provided a relatively simple, yet highly effective instrument for simultaneously and progressively inserting spaced parallel rows of staples in tissue to provide spaced rows of sutures, the use of the instrument requiring only two relatively small incisions to permit insertion of the operating parts thereof, there also being provided means for severing the walls or tissue between the rows of staples to provide communication between adjacent sutured organs. It will be seen that the instrument of this invention materially reduces the effort and time required in such an operation thereby contributing to the success thereof.

It will be obvious to those skilled in the art that various changes may be made in the invention without departing from the spirit and scope thereof and therefore the invention is not limited by that which is shown in the drawings and described in the specification, but only as indicated in the appended claims.

What is claimed is:

1. An instrument for suturing the gastric and intestinal walls with spaced parallel rows of metal staples, said instrument comprising a body member having an elongated pointed staple inserting jaw, a second body member pivotally and detachably connected to said first body member and having an elongated pointed staple clinching jaw disposed in the plane of said staple inserting jaw, means pivotally mounted on said second body member and engaging a part on said first body member to releasably lock said jaws in tissue clamping staple inserting position, a longitudinal groove in said staple inserting jaw opening toward said staple clinching jaw, a second longitudinal groove in said staple clinching jaw opposing and in alignment with said first groove, a plurality of longitudinally spaced opposed staple receiving recesses in the sidewalls of said first groove, a staple driver slidably mounted in each recess and having a lug projecting into said first groove and staple driver actuating means comprising an elongated bar slidably mounted on said first body member and received in said groove, a wedge on the end of said bar disposed in said first groove for progressively engaging said lugs, a finger engaging ear on said bar, releasable means on said first body member engaging said bar to prevent inadvertent operation thereof and a knife on said bar rearwardly of said wedge, said knife moving in said second groove and operating to sever tissue between rows of staples inserted and clinched in such tissue.

2. An instrument as defined in claim 1, in which spaced cheek pieces are provided on said first body member for receiving a portion of said second body member therebetween, and a pointed pin on said staple clinching jaw received in said first groove for maintaining said jaws in alignment.

3. An instrument for suturing the gastric and intestinal walls with spaced parallel rows of metal staples, said instrument comprising a body member having an elongated pointed staple inserting jaw, a second body member pivotally and detachably connected to said first body member and having an elongated pointed staple clinching jaw disposed in the plane of said staple inserting jaw, means pivotally mounted on said second body member and engaging a part on said first body member to releasably lock said jaws in tissue clamping staple inserting position, a longitudinal groove in said staple inserting jaw opening toward said staple clinching jaw, a plurality of longitudinally spaced opposed staple receiving recesses in the sidewalls of said groove, a staple driver slidably mounted in each recess and having a lug projecting into said groove and staple driver actuating means comprising an elongated bar slidably mounted on said first body member and received in said groove, a wedge on the end of said bar disposed in said groove for progressively engaging said lugs and a finger engaging ear on said bar.

4. An instrument for suturing the gastric and intestinal walls with spaced parallel rows of metal staples, said instrument comprising a body member having an elongated staple inserting jaw, a second body member detachably connected to said first body member and having an elongated staple clinching jaw disposed in the plane of said staple inserting jaw, a longitudinal groove in said staple inserting jaw opening toward said staple clinching jaw, a plurality of longitudinally spaced opposed staple receiving recesses in the sidewalls of said groove, a staple drive slidably mounted in each recess and staple driver actuating means comprising an elongated bar slidably mounted on said first body member and received in said groove and a wedge on the end of said bar disposed in said groove for progressively engaging said drivers.

References Cited in the file of this patent

UNITED STATES PATENTS 960,300     Fischer _____ June 7, 1910

FOREIGN PATENTS 406,832     Germany _____ Dec. 3, 1924